United States Patent
Yan et al.

(10) Patent No.: US 9,634,903 B2
(45) Date of Patent: Apr. 25, 2017

(54) METHOD AND APPARATUS FOR DISTRIBUTING CONTENT TO MULTIPLE DEVICES

(75) Inventors: Qifeng Yan, Espoo (FI); Wei Wang, Beijing (CN); Ling Wang, ShenZhen (CN); Dhaval Jitendra Joshi, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 292 days.

(21) Appl. No.: 14/373,031

(22) PCT Filed: Jan. 18, 2012

(86) PCT No.: PCT/CN2012/070543
§ 371 (c)(1),
(2), (4) Date: Jul. 17, 2014

(87) PCT Pub. No.: WO2013/107009
PCT Pub. Date: Jul. 25, 2013

(65) Prior Publication Data
US 2015/0058737 A1    Feb. 26, 2015

(51) Int. Cl.
*G06F 15/177* (2006.01)
*H04L 12/24* (2006.01)
(Continued)

(52) U.S. Cl.
CPC ............ *H04L 41/22* (2013.01); *G06F 3/0482* (2013.01); *G06F 3/04842* (2013.01);
(Continued)

(58) Field of Classification Search
CPC .................................................... H04W 12/08
(Continued)

(56) References Cited

U.S. PATENT DOCUMENTS 8,850,339 B2 * 9/2014 Hebbar ................... G06F 3/048
                                                                    715/744
2003/0151620 A1    8/2003 Fujita et al.
(Continued)

FOREIGN PATENT DOCUMENTS

| CN | 1852105 A | 10/2006 |
| CN | 1859105 A | 11/2006 |
| WO | 2005091161 A1 | 9/2005 |

OTHER PUBLICATIONS

International Search Report received for corresponding Patent Cooperation Treaty Application No. PCT/CN2012/070543 dated Nov. 1, 2012, 3 pages.

*Primary Examiner* — William Titcomb
(74) *Attorney, Agent, or Firm* — Ditthavong & Steiner, P.C.

(57) ABSTRACT

An approach is provided distributing content to multiple devices. Specifically, a distribution module causes, at least in part, a rendering of at least one user interface for distributing content among at least one device and one or more other devices with connectivity to the at least one device. The distribution module then causes, at least in part, one or more segmentations of the at least one user interface, wherein the one or more segmentations are associated with the at least one device, respective one or more of the one or more other devices, or a combination thereof. Next, the distribution module determines one or more interactions with the at least one user interface, the one or more segmentations, or a combination thereof to cause, at least in part, a distribution of the content.

20 Claims, 9 Drawing Sheets

(51) Int. Cl.
  *H04L 12/403* (2006.01)
  *G06F 3/0482* (2013.01)
  *G06F 3/0484* (2013.01)
  *H04L 29/08* (2006.01)
  *H04W 12/08* (2009.01)
(52) U.S. Cl.
  CPC ............ *H04L 12/403* (2013.01); *H04L 67/10* (2013.01); *H04W 12/08* (2013.01)
(58) Field of Classification Search
  USPC ........................................................ 715/736
  See application file for complete search history.

(56) References Cited

U.S. PATENT DOCUMENTS

| | | | | |
|---|---|---|---|---|
| 2006/0265503 | A1* | 11/2006 | Jones | G06F 17/30899 709/227 |
| 2008/0120547 | A1* | 5/2008 | Cho | G06F 3/048 715/716 |
| 2008/0155459 | A1* | 6/2008 | Ubillos | G11B 27/034 715/783 |
| 2009/0013271 | A1* | 1/2009 | Helfman | G06F 17/30572 715/764 |
| 2009/0013287 | A1* | 1/2009 | Helfman | G06T 11/206 715/853 |
| 2010/0005068 | A1* | 1/2010 | Howard | G06T 11/60 707/E17.108 |
| 2010/0100581 | A1* | 4/2010 | Landow | H04L 67/02 709/203 |
| 2010/0293190 | A1* | 11/2010 | Kaiser | G06F 3/048 707/769 |
| 2011/0105090 | A1* | 5/2011 | Shackleton | G06Q 20/3224 455/414.1 |
| 2012/0324353 | A1* | 12/2012 | Torbey | G06F 3/048 715/716 |
| 2013/0132886 | A1* | 5/2013 | Mangini | G06F 3/048 715/781 |
| 2013/0339870 | A1* | 12/2013 | Tandra Sishtla | G06F 17/2836 715/744 |
| 2014/0033086 | A1* | 1/2014 | Hebbar | G06F 3/048 715/764 |
| 2014/0132626 | A1* | 5/2014 | Shih | G09G 5/34 345/629 |

* cited by examiner

METHOD AND APPARATUS FOR DISTRIBUTING CONTENT TO MULTIPLE DEVICES

RELATED APPLICATION

This application was originally filed as PCT Application No. PCT/CN2012/070543 filed on Jan. 18, 2012.

BACKGROUND

Service providers and device manufacturers (e.g., wireless, cellular, etc.) are continually challenged to deliver value and convenience to consumers by, for example, providing compelling network services. One area of interest has been the development of services that enable users to view and distribute content (e.g., songs, movies, pictures, electronic books, etc.) over the Internet using mobile devices (e.g., mobile phones). However, in developing markets (e.g., China, India, and Africa) Internet access is still a challenge. More specifically, many users in these regions have to rely on content vendors, invest in a computer, or utilize slow one-to-one content sharing technologies (e.g., Bluetooth®) in order to obtain content via the Internet. As a result, a majority of users in developing countries have limited access to content that is distributed over the Internet and/or social networking services (e.g., FACEBOOK, TWITTER, etc.). Accordingly, service providers and device manufacturers face significant technical challenges to provide users in emerging markets with the ability to obtain and to distribute content using mobile devices.

SOME EXAMPLE EMBODIMENTS

Therefore, there is a need for an approach for distributing content to multiple devices.

According to one embodiment, a method comprises causing, at least in part, a rendering of at least one user interface for distributing content among at least one device and one or more other devices with connectivity to the at least one device. The method also comprises causing, at least in part, one or more segmentations of the at least one user interface, wherein the one or more segmentations are associated with one or more interfaces to the at least one device, respective one or more of the one or more other devices, or a combination thereof. The method further comprises determining one or more interactions with the at least one user interface, the one or more segmentations, or a combination thereof to cause, at least in part, a distribution of the content.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a rendering of at least one user interface for distributing content among at least one device and one or more other devices with connectivity to the at least one device. The apparatus is also caused to cause, at least in part, one or more segmentations of the at least one user interface, wherein the one or more segmentations are associated with the at least one device, respective one or more of the one or more other devices, or a combination thereof. The apparatus is further caused to determine one or more interactions with the at least one user interface, the one or more segmentations, or a combination thereof to cause, at least in part, a distribution of the content.

According to another embodiment, a computer-readable storage medium carries one or more sequences of one or more instructions which, when executed by one or more processors, cause, at least in part, an apparatus to cause, at least in part, a rendering of at least one user interface for distributing content among at least one device and one or more other devices with connectivity to the at least one device. The apparatus is also caused to cause, at least in part, one or more segmentations of the at least one user interface, wherein the one or more segmentations are associated with the at least one device, respective one or more of the one or more other devices, or a combination thereof. The apparatus is further caused to determine one or more interactions with the at least one user interface, the one or more segmentations, or a combination thereof to cause, at least in part, a distribution of the content.

According to another embodiment, an apparatus comprises means for causing, at least in part, a rendering of at least one user interface for distributing content among at least one device and one or more other devices with connectivity to the at least one device. The apparatus also comprises means for causing, at least in part, one or more segmentations of the at least one user interface, wherein the one or more segmentations are associated with the at least one device, respective one or more of the one or more other devices, or a combination thereof. The apparatus further comprises means for determine one or more interactions with the at least one user interface, the one or more segmentations, or a combination thereof to cause, at least in part, a distribution of the content.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for distributing content to multiple devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
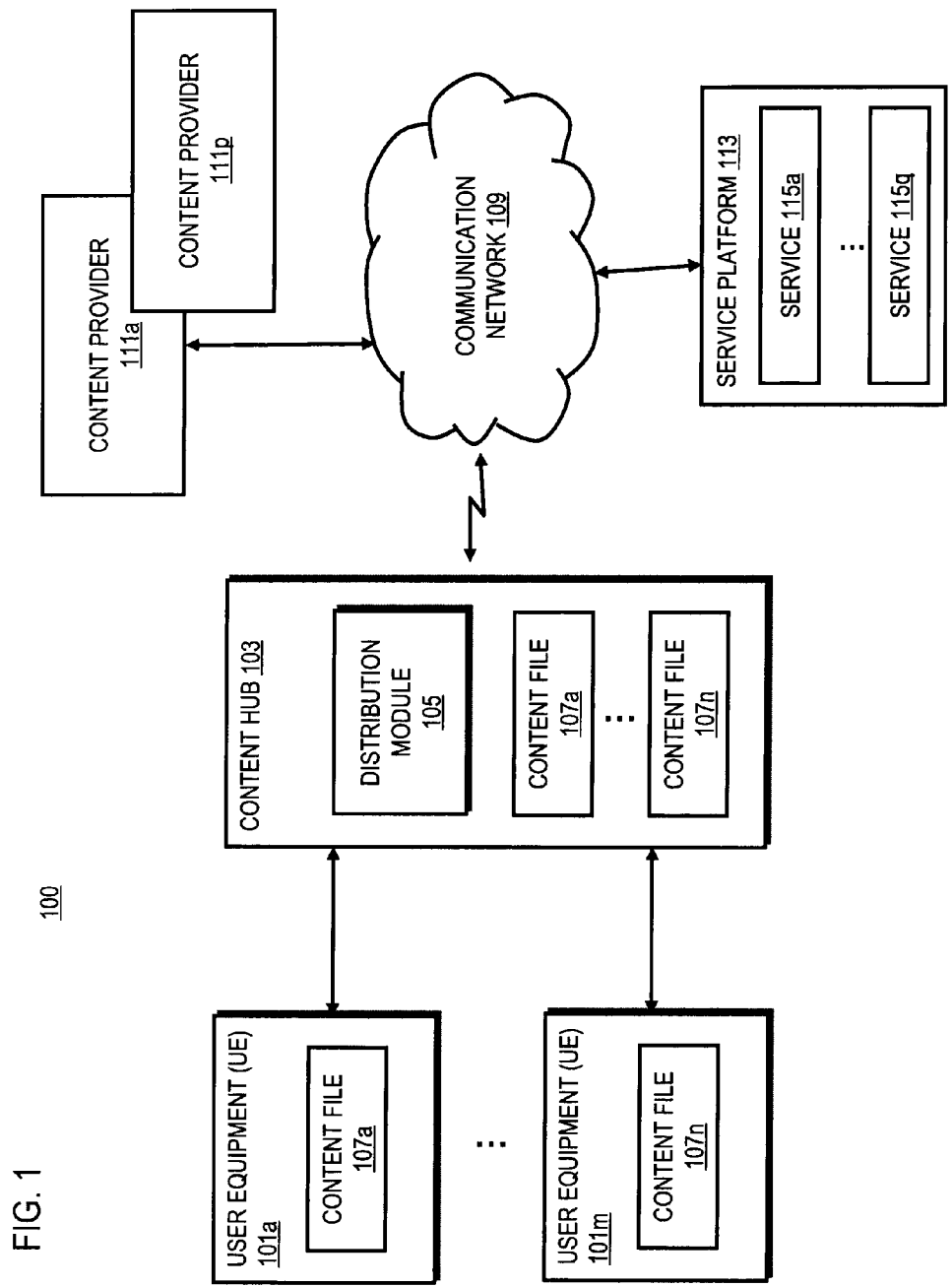
FIG. 1 is a diagram of a system capable of distributing content to multiple devices, according to one embodiment.

FIG. 1 is a diagram of a system capable of distributing content to multiple devices, according to one embodiment. As previously discussed, in developing markets (e.g., China, India, and Africa) obtaining Internet access is still a challenge for a majority of users. As a result, the majority of users in these regions have limited access to content (e.g., songs, movies, pictures, electronic books, etc.) that is distributed over the Internet and/or social networking services (e.g., FACEBOOK, TWITTER, etc.). More specifically, many users in these regions have to rely on content vendors, invest in a computer, or utilize slow one-to-one content sharing technologies (e.g., Bluetooth®) in order to transmit content via the Internet.

To address this problem, a system 100 of FIG. 1 introduces the capability to distribute content to multiple devices. More specifically, in one embodiment, the system 100 first causes a rendering of at least one user interface (e.g., a graphical user interface (GUI) in at least one device (e.g., a "hub" tablet or mobile tablet) to enable a distribution of content (e.g., songs, movies, pictures, electronic books, mobile applications, homework assignments, etc.) among one or more other devices (e.g., mobile phones) having connectivity to the at least one device. In one embodiment, the content is made available by one or more content providers (e.g., a mobile application store) via a communication network (e.g., the Internet) and can be stored locally on the at least one device for later distribution to the one or more other devices. In another embodiment, the system 100 can enable content (e.g., pictures, homework assignments, etc.) to be uploaded to the at least one device from one or more of the one or more other devices. In a further embodiment, the system 100 can enable content (e.g., a local advertisement, local news, etc.) to be recorded by the at least one device and then cause a broadcast and/or distribution of the recorded content to the one or more other devices. Further, the system 100 can enable one or more of the one or more other devices to access one or more services (e.g., social networking services, firmware update services, media streaming services, or a combination thereof) through the one or more connections to the least one device.

In one embodiment, the system 100 next determines one or more connectivity ports (e.g., universal serial bus (USB) ports, secure digital (SD) card ports, audio jacks, etc.) associated with the at least one device, wherein the one or more other devices establish connectivity with the at least one device via the one or more connectivity ports. By way of example, the one or more other devices connected to the at least one device (e.g., using one or more USB ports) would function in a slave mode (i.e., a dumb memory device) and the at least one device would function in a master mode (e.g., a content distributor). In one embodiment, the one or more physical ports (e.g., USB ports) of the at least one device can also support a charging of the one or more other devices. In another embodiment, the one or more other devices can synchronously be connected to the at least one device via one or more wireless connections (e.g., Bluetooth®). In addition, content can be transferred among the system 100 through the use of one or more SD cards associated with the one or more other devices.

In one embodiment, once the one or more other devices are connected to the at least one device, the system 100 causes one or more segmentations of the at least one user interface of the at least one device, wherein the one or more segmentations are associated with the at least one device (e.g., a center segmentation), respective one or more of the one or more other devices, or a combination thereof. In addition, the system 100 determines status information (e.g., battery life, storage capacity, transfer type, download/upload status, etc.) associated with the at least one device, the one or more other devices, or a combination thereof and then causes a rendering of the status information in the one or more segmentations. By way of example, the at least one user interface of the at least one device can display the status of the one or more other devices based on the connectivity port by which the one or more other devices are connected to the at least one device.

In one embodiment, the system 100 causes a rendering of the available content in the at least one user interface of the least one device. As a result, one or more users can browse the content pool in the middle of the GUI of the at least one device. In one embodiment, the system 100 then determines one or more interactions (e.g., a haptic movement) with the at least one user interface, the one or more segmentations, or a combination thereof to cause a distribution of the content from the middle of the GUT to one or more segmentations. More specifically, the system 100 processes the one or more interactions to determine a selection of at least a portion of the content (e.g., a song), at least one of the one or more segmentations, or a combination thereof. By way of example, if a user is interested in a portion of the content (e.g., a song), he or she can select that song by dragging the song from the center of the user interface of the at least one device to the segmentation corresponding to the connectivity port associated with his or her mobile device. The system 100 can then cause a rendering in the respective segmentation of the at least a portion of the content (e.g., a song), one or more previews of the at least a portion of the content (e.g., a minute one sample of the song), or a combination thereof. As previously discussed, the system 100 can also cause a rendering of one or more advertisements (e.g., advertisements recorded in a local language), other related content (e.g., local news), or a combination thereof in the at least one user interface, the one or more segmentations, or a combination thereof. By way of example, the system 100 can render a local advertisement before rendering the selected content, one or more previews, or a combination thereof.

In one embodiment, once the system 100 determines that one or more users are interested in at least a portion of the available content (e.g., by determining a selection of a "download" button on the at least one user interface of the at least one device), the system 100 can determine capability information associated with the user's mobile device (e.g., operating system, folder structure, file format, etc.) and then processes this information to determine at least one format of the at least a portion of the content (e.g., a song) that is at least substantially compatible with the user's mobile device (e.g., Moving Picture Experts Group (MPEG)—2 Audio Layer III (MP3), Advance Audio Coding (AAC), etc.). The system 100 can then cause a transfer of the at least a portion of the content to the device associated with the respective segmentation. In one embodiment, the system 100 enables one or more users to exchange content between one or more other devices via the at least one user interface of the at least one device.

By way of example, the system 100 can also be utilized by a teacher to distribute one or more homework assignments to one or more students through one or more other devices connected to the at least one device. Likewise, one or more students can utilize the system 100 in order to return their completed homework assignments to the teacher and/or work collaboratively together on one or more homework assignments (e.g., exchanging portions of a group report) by connecting one or more other devices to the at least one device. In another example use case, the owner of the at least one device (e.g., a mobile tablet) can utilize the frequency modulation (FM) trans-receiver of the system 100 to broadcast one or more advertisements (e.g., advertisements recorded in a local language) for newly obtained content. In addition, the owner may also play one or more free songs so that many users can listen and learn about the latest offerings and current events. As a result, one or more users may hear the broadcast and come towards the owner to browse and possibly purchase the new content. If the one or more users decide to purchase the content, they can pay the owner in a face-to-face method. In a further example use case, one or more users may connect their one or more other devices (e.g., mobile phones) to the at least one device (e.g., mobile tablet or hub tablet) in order to gain access to one or more social networking services (e.g., FACEBOOK) in order to update a social networking status or to gain access to a firmware update, etc. As previously discussed, the one or more users can also charge their mobile devices at the at least one device while they browsing the content and/or accessing one or more social networking services via the at least one device.

As shown in FIG. 1, the system 100 comprises one or more user (UE) 101a-101m (e.g., a mobile phone) (also collectively referred to as UEs 101) having connectivity to a content hub 103 (e.g., a mobile tablet) containing a distribution module 105 and one or more content files 107a-107n (e.g., songs, movies, pictures, electronic books, homework assignments, etc.) (also collectively referred to as content files 107). The content hub 103 also has connectivity to one or more content providers 111a-111p (e.g., a mobile application store) (also collectively referred to as content providers 111) and a service platform 113 containing one or more services 115a-115q (also collectively referred to as services 115). The one or more services 115 may include one or more social networking services (e.g., FACEBOOK, TWITTER, etc.), one or more firmware maintenance services, one or more media services (e.g., a media streaming service), or a combination thereof. In one embodiment, the UEs 101 may also be connected to the content hub 103 via one or more wireless connections (e.g., Bluetooth®). In addition, one or more content files 107 may be transferred among the system 100 through the use of one or more SD cards associated with the one or more UEs 101.

In one embodiment, the distribution module 105 causes a rendering of at least one user interface (e.g., a GUI) at the content hub 103 (e.g., a mobile tablet) to enable the distribution of one or more content files 107 (e.g., songs, movies, pictures, electronic books, mobile applications, homework assignments, etc.) among the UEs 101 (e.g., mobile phones) having connectivity to the content hub 103. In one embodiment, the one or more content files 107 are made available by the content providers 111 (e.g., a mobile application store), the services 115 (e.g., one or more social networking services), or a combination thereof and can be stored locally at the content hub 103 for later distribution to the UEs 101. In one example use case, one or more content files 107 (e.g., pictures, homework assignments, etc.) can also be uploaded from one or more of the UEs 101 to the content hub 103. In another embodiment, the distribution module 105 can enable the recording of one or more content files 107 (e.g., local advertisements, local news, etc.) and then cause the broadcast and/or distribution of the one or more recorded content files 107 to the UEs 101. In addition, the distribution module 105 can also enable one or more of the UEs 101 to access one or more services (e.g., social networking services, firmware updates, etc.) through one or more connections to the content hub 103 and therefore provide the one or more users of the UEs 101 Internet access.

In one embodiment, the distribution module 105 next determines one or more connectivity ports (e.g., USB ports, SD card ports, audio jacks, etc.) associated with the content hub 103, wherein the UEs 101 establish connectivity with the content hub 103 via the one or more connectivity ports. As previously discussed, the one or more UEs 101 connected to the content hub 103 (e.g., by one or more USB hubs) can act in a slave mode (i.e., a dumb memory device) and the content hub 103 can function in a master mode (e.g., a content distributor). In one embodiment, the one or more physical ports (e.g., USB ports) of the content hub 103 can support a charging of the one or more UEs 101. In another embodiment, one or more UEs 101 can synchronously be connected to the content hub 103 via one or more wireless connections (e.g., Bluetooth®). In addition, one or more content files 107 from the content hub 103 can also be transferred to one or more of the UEs 101 through the use of one or more SD cards associated with the one or more UEs 101.

In one embodiment, once one or more UEs 101 are connected to the content hub 103, the distribution module 105 causes one or more segmentations of at least one user interface (e.g., a GUI) of the content hub 103, wherein the one or more segmentations are associated with the content hub 103 (e.g., a center segment), the respective one or more UEs 101, or a combination thereof. In addition, the distribution module 105 determines status information (e.g., battery life, storage capacity, transfer type, download/upload, etc.) associated with the content hub 103, the one or more UEs 101, or a combination thereof and then causes a rendering of the status information in the one or more segmentations of the content hub 103. By way of example, the user interface of the content hub 103 can display the status of the one or more UEs 101 based on the connectivity port by which the one or more UEs 101 are connected to the content hub 103.

In one embodiment, the distribution module 105 then causes a rendering of the one or more available content files 107 (e.g., songs, electronic books, movies, etc.) at the at least one user interface of the content hub 103. As a result, one or more users can browse the content pool (e.g., in the middle of the display) of the content hub 103. In one embodiment, the distribution module 105 next determines one or more interactions (e.g., a haptic movement) with the user interface of the content hub 103, the one or more segmentations, or a combination thereof to cause a distribution of the one of more content files 107 from the middle of the display to the one or more segmentations. More specifically, the distribution module 105 processes the one or more interactions to determine a selection of the one or more content files 107 (e.g., a song), at least one of the one or more segmentations, or a combination thereof. As previously discussed, in one example use case, if a user is interested in one or more of the one or more content files 107 (e.g., a song), he or she can select that content file 107 by dragging the content file 107 from the middle of the GUI of the content hub 103 to the segmentation corresponding to the connectivity port associated with his or her UE 101 (e.g., a mobile device). The distribution module 105 then causes a rendering in the respective segmentation of the content file 107, one or more previews (e.g., a one minute sample), or a combination thereof. As previously discussed, the distribution module 105 can also cause a rendering of one or more advertisements (e.g., advertisements recorded in a local language), other related content (e.g., local news), or a combination thereof in at least one user interface of the content hub 103, the one or more segmentations, or a combination thereof. By way of example, the distribution module 105 can also render a local advertisement before rendering the selected content file 107, one or more previews, or a combination thereof.

In one embodiment, once the distribution module 105 determines that one or more users are interested in one or more content files 107, (e.g., by determining a selection of a "download" button on the use interface of the content hub 103), the distribution module 105 determines capability information associated with the user's UE 101 (e.g., operating system, folder structure, file format, etc.) and then processes this information to determine at least one format of the one or more content files 107 that is at least substantially compatible with the user's UE 101 (e.g., MP3, AAC, etc.). The distribution module 105 then causes a transfer of the one or more content files 107 to the UE 101 associated with the respective segmentation. As previously discussed, in one embodiment, the distribution module 105 also enables one or more users to exchange content among the one or more UEs 101 via the at least one user interface of the content hub 103.

By way of example, the distribution module 105 of the content hub 103 can also be utilized by a teacher to distribute one or more homework assignments to one or more students through one or more UEs 101 connected to the content hub 103. Similarly, one or more students can utilize the distribution module 105 to return their completed homework assignments to the teacher using the content hub 103 and/or work collaboratively together on one or more homework assignments by connecting one or more UEs 101 to the content hub 103. In another example use case, the owner of the content hub 103 (e.g., a mobile tablet) can utilize the FM trans-receiver of the distribution module 105 to broadcast one or more advertisements (e.g., advertisements recorded in a local language) related to one or more newly obtained content files 107. As a result, one or more users may hear the one or more advertisements and approach the owner in order to browse and possibly purchase the one or more newly obtained content files 107. If the one or more users decide to purchase the one or more content files 107, he or she can pay the owner in a face-to-face method. In a further example use case, one or more users may connect their UEs 101 to the content hub 103 in order to gain access to one or more social networking services (e.g., FACEBOOK, TWITTER, etc.) to update a social networking status or to gain access to a firmware update, etc. As previously discussed, in one embodiment, the one or more users can also charge their UEs 101 at the content hub 103 while they browsing the one or more content files 107 and/or accessing the one or more social networking services via the content hub 103.

By way of example, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101, the content hub 103, the content providers 111, and the service platform 113 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
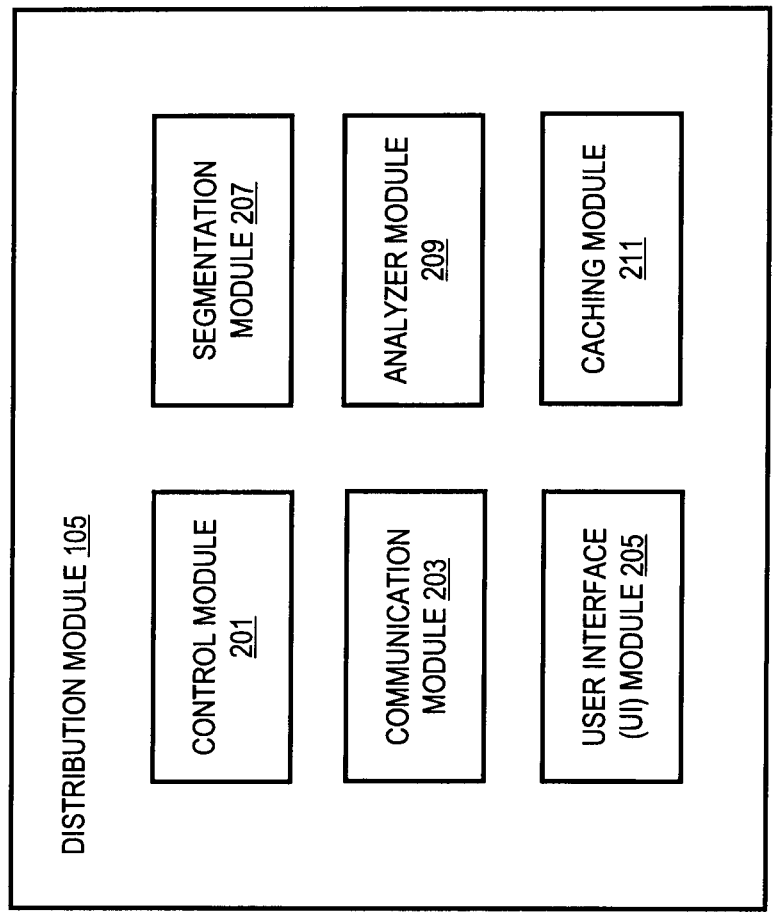
FIG. 2 is a diagram of the components of a distribution module, according to one embodiment.

FIG. 2 is a diagram of the components of the distribution module 105, according to one embodiment. By way of example, the distribution module 105 includes one or more components for providing distributing content to multiple devices. It is contemplated that the functions of these components may be combined in one or more components or performed by other components of equivalent functionality. In this embodiment, the distribution module 105 includes a control module 201, a communication module 203, a user interface (UI) module 205, a segmentation module 207, an analyzer module 209, and a caching module 211.

In one embodiment, the control module 201 executes at least one algorithm for executing functions of the distribution module 105. For example, the control module 201 may execute an algorithm for processing one or more interactions with the content hub 103 (e.g., a mobile tablet) in order to distribute content (e.g., songs, movies, pictures, electronic books, mobile applications, homework assignments, etc.) among one or more LTEs 101 (e.g., mobile phones) connected to the content hub 103. By way of another example, the control module 201 may execute an algorithm to interact with the communication module 203 to communicate among the one or more UEs 101, the content hub 103, the distribution module 105, the content providers 111, and the service platform 113. The control module 201 also may execute an algorithm to interact with the user interface (UI) module 205 to render at least one user interface (e.g., a GUI) at the content hub 103 for distributing one or more content files 107 among the one or more UEs 101 with connectivity to the content hub 103. The control module 201 may also execute an algorithm to interact with the segmentation module 207 to cause one or more segmentations of the at least one user interface of the content hub 103, wherein the one or more segmentations are associated with the content hub 103, respective one or more UEs 101, or a combination thereof. The control module 201 also may execute an algorithm to interact with the analyzer module 209 to determine one or more interactions with the content hub 103, the one or more segmentations, or a combination thereof to cause a distribution of one or more content files 107. Further, the control module 201 may also execute an algorithm to interact with the caching module 211 to cause a caching of one or more content files 107, one or more advertisements (e.g., advertisements recorded in a local language), other related content (e.g., local news), or a combination thereof.

The communication module 203 is used for communication between the UEs 101, the content hub 103, the distribution module 105, the content providers 111, and the service platform 113. The communication module 203 also may be used to communicate commands, requests, data, etc. The communication module 203 may also be used to cause a transfer of one or more content files 107 to at least one of the one or more UEs 101 associated with the one or more segmentations of the content hub 103. More specifically, the communication module 203 may be used in connection with the one or more connectivity ports including one or more physical ports (e.g., USB and SD card ports), one or more wireless ports (e.g., Bluetooth®), or a combination thereof. In one embodiment, the communication module 203, in connection with the segmentation module 207 and the caching module 211, may be used to cause a distribution of one or more uploaded content files 107 to the content hub 103, one or more UEs 101, or a combination thereof. In another embodiment, the communication module 203 may be used to record and/or broadcast local content (e.g., local advertisements, local news, etc.). Further, the communication module 203 also may be used as an FM trans-receiver to broadcast one or more FM stations.

The user interface (UI) module 205 is used cause a rendering of at least one user interface (e.g., a GUI) for distributing one or more content files 107 (e.g., songs, movies, pictures, electronic books, mobile applications, homework assignments, etc.) among the content hub 103 and one or more UEs 101 with connectivity to the content hub. The user interface module 205, in connection with the analyzer module 209, may also be used to render status information associated with the content hub 103, the one or more UEs 101, or a combination thereof. In addition, the user interface module 205, in connection with the analyzer module 209, also may be used to determine one or more interactions with content hub 103, the one or more segmentations, or a combination thereof. Further, the user interface module 205, in connection with the analyzer module 209, may also be used to process the one or more interactions to determine a selection of one or more content files 107, at least one of the one or more segmentations, or a combination thereof. The user interface module 205 also may be used to render one or more content files 107, one or more previews (e.g., a one minute sample), or a combination thereof in at least one of the one or more segmentations of the content hub 103. In addition, the user interface module 205, in connection with the caching module 211, may be used to render one or more advertisements (e.g., advertisements recorded in a local language), other related material (e.g., local news), or a combination thereof in at least one user interface (e.g., a GUI) of the content hub 103, one or more segmentations, or a combination thereof.

The segmentation module 207 is used to cause one or more segmentations of at least one user interface (e.g., a GUI) of the content hub 103, wherein the one or more segmentations are associated with the content hub 103, respective one or more UEs 101, or a combination thereof. The segmentation module 207, in connection with the analyzer module 209, may also be used to cause an assignment of the one or more segmentations of the content hub 103 to the one or more UEs 101 based on the one or more connectivity ports of the content hub 103 (e.g., USB ports, SD card ports, etc.).

The analyzer module 209 is used to determine one or more connectivity ports associated with the content hub 103, wherein the one or more UEs 101 establish connectivity with the content hub 103 via the one or more connectivity ports. By way of example, the one or more connectivity ports can include one or more physical ports (e.g., USB ports, SD card ports, audio jacks, etc.), one or more wireless ports (e.g., Bluetooth®), or a combination thereof. As previously discussed, the analyzer module 209, in connection with the segmentation module 207, may be used to assign the one or more segmentations of the content hub 103 to the one or more UEs 101 based on the one or more connectivity ports. The analyzer module 209 also may be used determine status information associated with the content hub 103, the one or more UEs 101, or a combination thereof. In addition, the analyzer module 209, in connection with the user interface module 205, may be used to determine one or more interactions (e.g., a haptic movement) with the at least one user interface of the content hub 103, the one or more segmentations, or a combination thereof to cause a distribution of the one or more content files 107. The analyzer module 209 may also be used to determine capability information associated with the one or more UEs 101 (e.g., operating system, folder structure, file format, etc.). Moreover, the analyzer module 209 also may be used to process the capability information to determine at least one format of the one or more content files 107 (e.g., MP3, AAC, etc.) that is at least substantially compatible with at least one of the one or more UEs 101.

In one embodiment, the caching module 211 is used to cache the one or more content files 107, one or more advertisements (e.g., advertisements recorded in a local language), other related content (e.g., local news), or a combination thereof.

Figure 3:
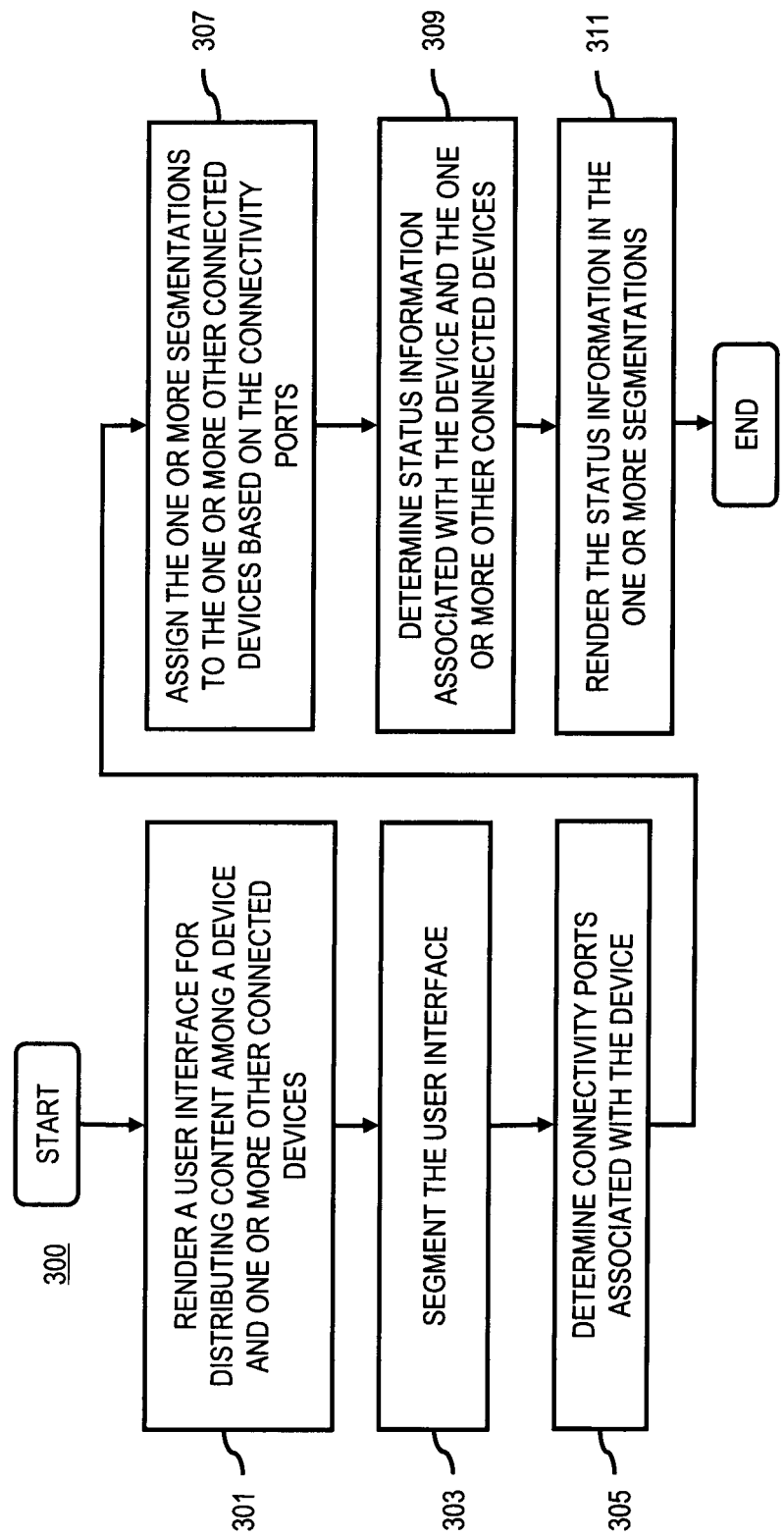
FIGS. 3 and 4 are flowcharts of processes for distributing content to multiple devices, according to one embodiment.
Figure 8:
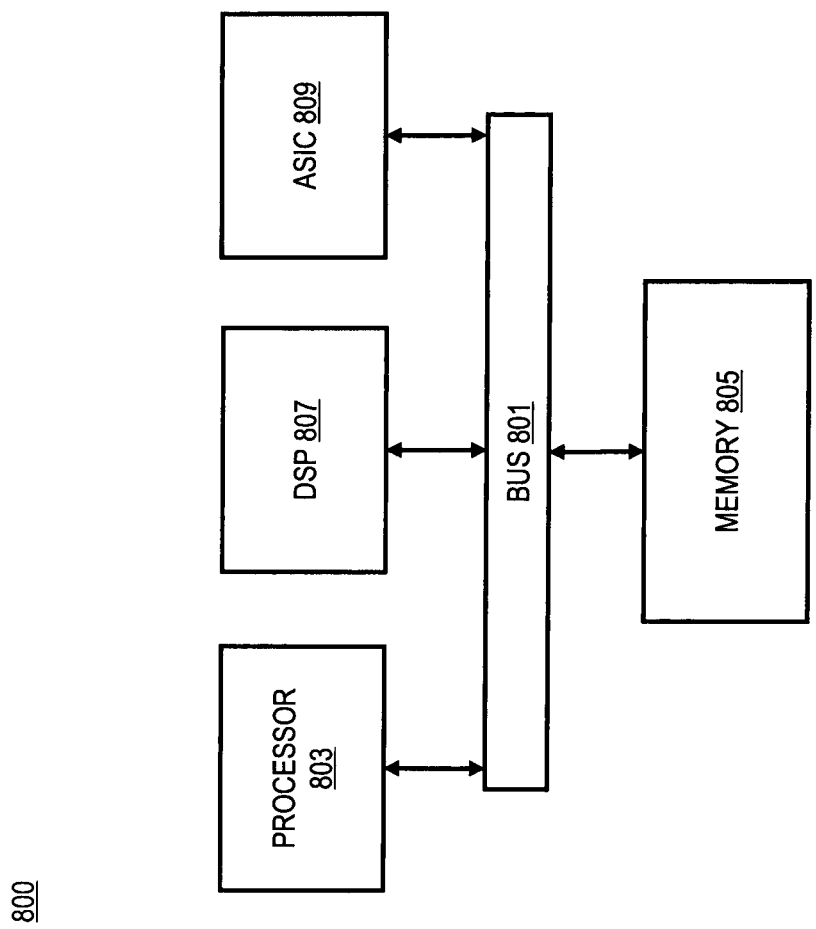
FIG. 8 is a diagram of a chip set that can be used to implement an embodiment of the invention.

FIG. 3 is a flowchart of a process for distributing content to multiple devices, according to one embodiment, FIG. 3 depicts a process 300 of connecting at least one device (e.g., a mobile tablet) and one or more other devices (e.g., mobile phones) for the purpose of distributing content among the devices. In one embodiment, the distribution module 105 performs the process 300 and is implemented in, for instance, a chip set including a processor and a memory as shown in FIG. 8. In step 301, the distribution module 105 causes, at least in part, a rendering of at least one user interface for distributing content among at least one device and one or more other devices with connectivity to the at least one device. By way of example, the at least one user interface may consist of a graphical user interface (GUI) and the at least one device may include a mobile tablet or a "hub" tablet that includes one or more connectivity ports (e.g., USB ports, SD card ports, audio jacks, Bluetooth®, etc.). In addition, the content can comprise songs, movies, pictures, electronic books, mobile applications, homework assignments, etc. In one embodiment, the content is determined from one or more content providers (e.g., a mobile application store), one or more services (e.g., media streaming services, FM radio stations, etc.), or a combination thereof. In another embodiment, the content (e.g., local advertisements, local news, etc.) can be uploaded from at least one of the one or more other devices (e.g., mobile phones) and/or recorded (e.g., in a local language) using the distribution module 105. As previously discussed, in one embodiment, the one or more other devices connected to the at least one device (e.g., using one or more USB ports) may function in a slave mode (i.e., a dumb memory device) and the at least one device may function in a master mode (e.g., a content distributor).

Figure 5:
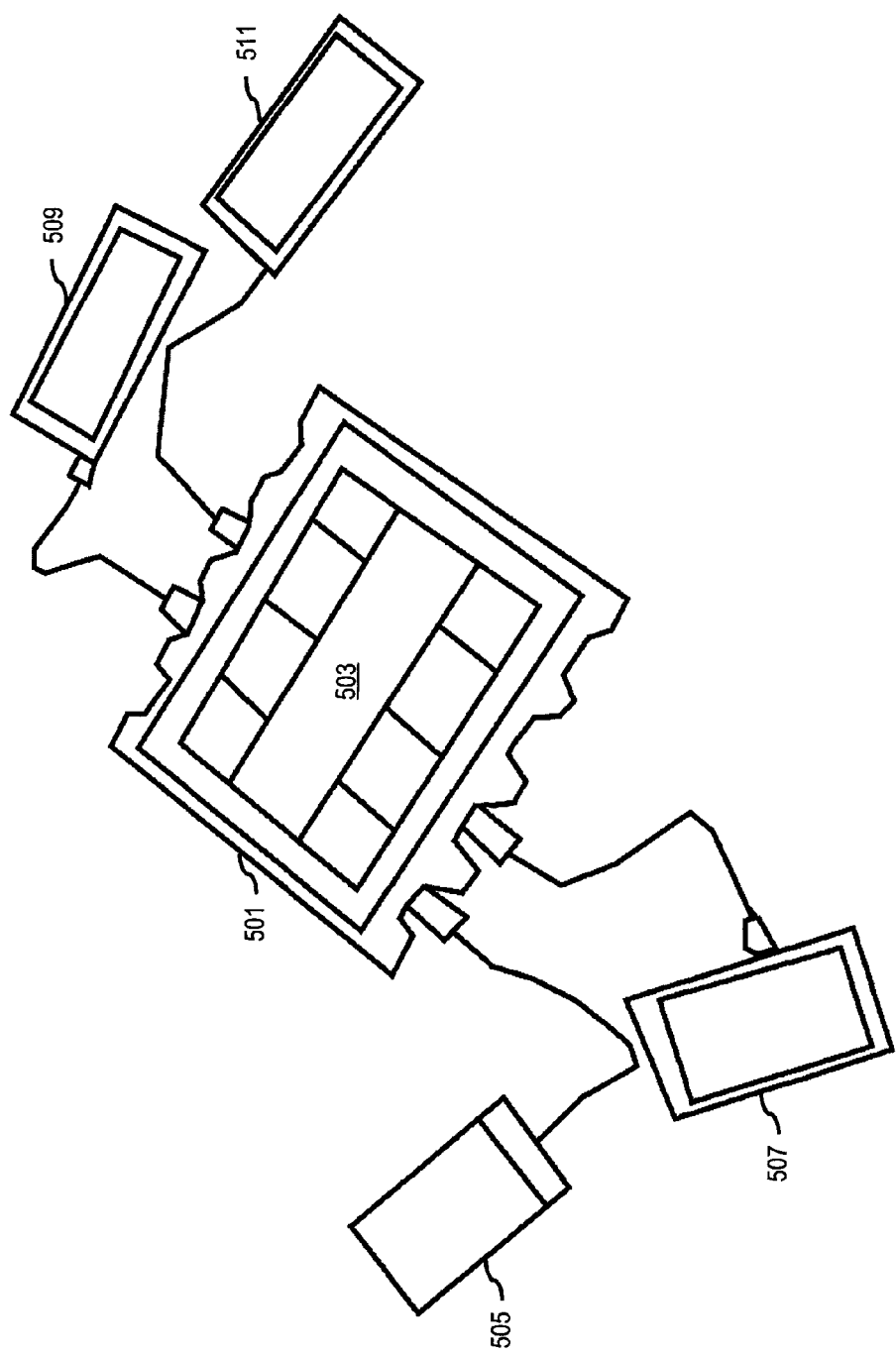
FIG. 5 is a diagram of an example of one or more mobile devices utilized in the processes of FIGS. 3 and 4, according to one embodiment.
Figure 6:
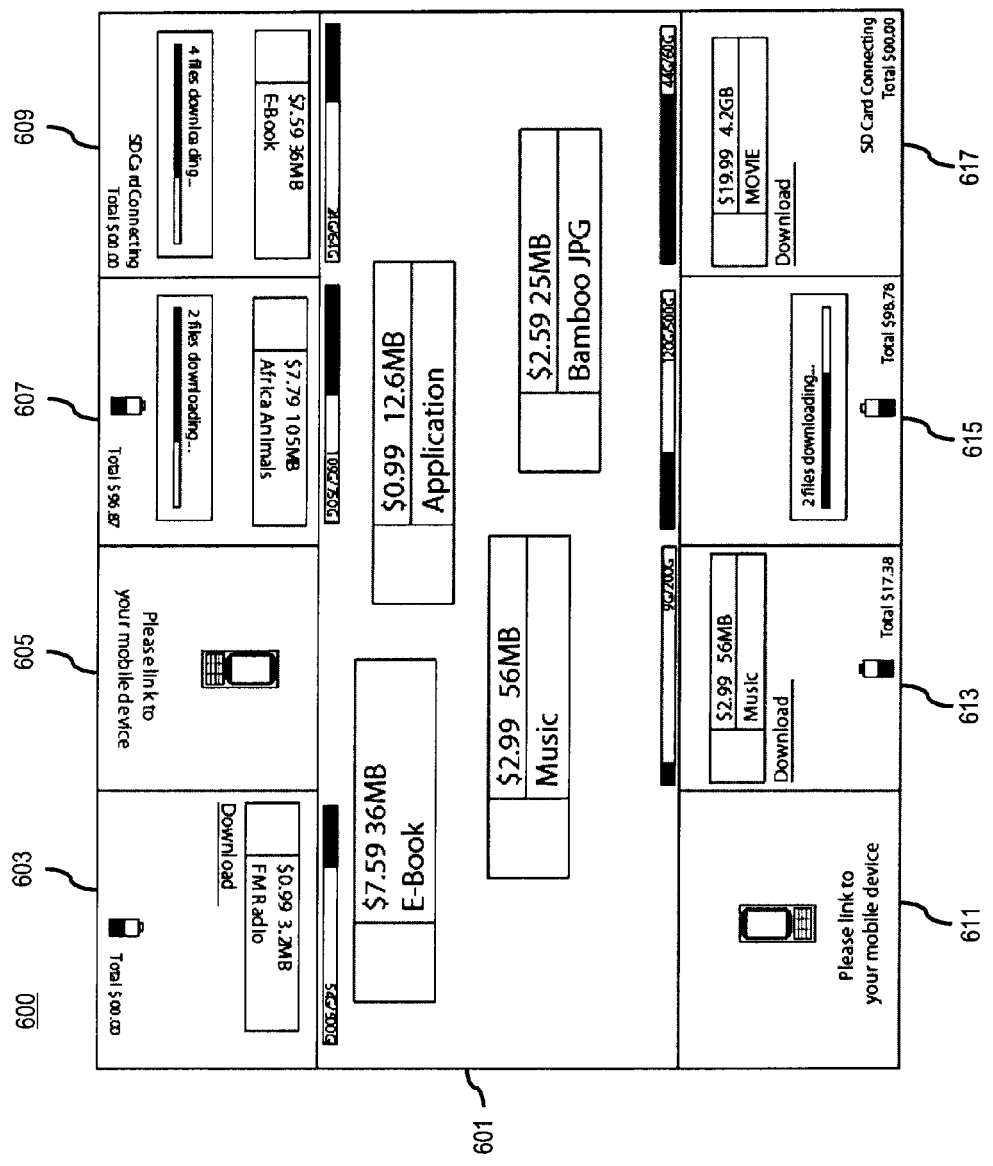
FIG. 6 is a diagram of an example user interface utilized in the processes of FIGS. 3 and 4, according to various embodiments.

In step 303, the distribution module 105 causes, at least in part, one or more segmentations of the at least one user interface, wherein the one or more segmentations are associated with the at least one device, respective one or more of the one or more other devices, or a combination thereof. By way of example, the one or more segmentations may include a central segmentation in the middle of the at least one user interface (e.g., a GUI) of the at least one device (e.g., a mobile tablet) and one or more additional segmentations associated with the one or more connectivity ports associated with the one or more other devices (e.g., mobile phones). An illustrative example of the one or more segmentations is depicted in FIGS. 5 and 6.

In step 305, the distribution module 105 determines one or more connectivity ports associated with the at least one device, wherein the one or more other devices establish connectivity to the at least one device via the one or more connectivity ports. By way of example the one or more connectivity ports include one or more physical ports (e.g., USB ports, SD card ports, and audio jacks) and one or more wireless ports (e.g., Bluetooth®), or a combination thereof. In addition, in one embodiment, the one or more physical ports (e.g., USB ports) can support a charging of the one or more other devices (e.g., mobile phones). As previously discussed, in one example use case, one or more users can charge their mobile devices at the at least one device while browsing the content and/or accessing one or more social networking services via the at least one device.

In step 307, the distribution module 105 causes, at least in part, an assignment of the one or more segmentations to the one or more other devices based, at least in part, on the one or more connectivity ports. By way of example, the distribution module 105 can virtually assign port numbers to the one or more physical ports of the at least one device and then assign the one or more segmentations based, at least in part, on the physical port associated with the one or more other devices are connected to the at least one device.

In step 309, the distribution module 105 determines status information associated with the at least one device, the one or more other devices, or a combination thereof. By way of example, the status information can include battery life, storage capacity, transfer type, download/upload status, etc. In step 311, the distribution module 105 causes, at least in part, a rendering of the status information in the one or more segmentations. An illustrative example of the rendering of the status information in the one or more segmentations is depicted in FIG. 6.

Figure 4:
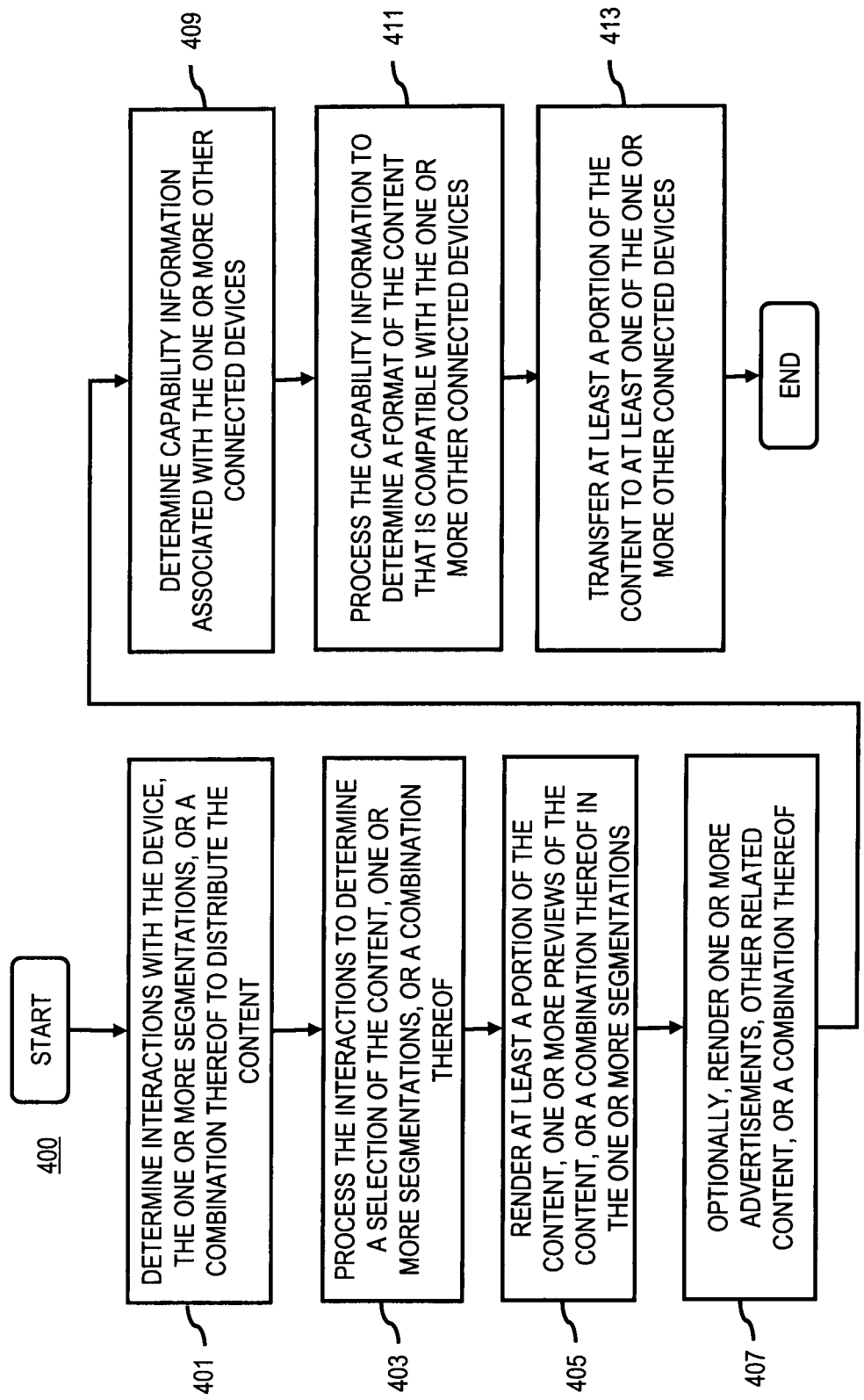

FIG. 4 is a flowchart of a process for distributing content to multiple devices, according to one embodiment. FIG. 4 depicts a process 400 of determining one or more interactions and then distributing content as a result of the one or more interactions. In one embodiment, the distribution module 105 performs the process 400 and is implemented in, for instance, a chip set including a processor and a memory as shown in FIG. 8. In step 401, the distribution module 105 determines one or more interactions with the at least one user interface, the one or more segmentations, or a combination thereof to cause, at least in part, a distribution of the content. By way of example, the one or more interactions may include one or more haptic actions (e.g., touching, swiping, gesturing, tilting, pouring, etc.) across the GUI of the at least one device.

In step 403, the distribution module 105 processes and/or facilitates a processing of the one or more interactions to determine a selection of at least a portion of the content, at least one of the one or more segmentations, or a combination thereof. By way of example, one or more users can browse the content of the at least one device, which can be seen in the middle of the GUI of the at least one device. In one example use case, if User A is interested in at least one content file (e.g., a music file) of the one or more content files stored in the distribution module 105 and/or accessible from one or more content providers, one or more services, or a combination thereof, he or she can drag the at least one content (e.g., music |file|$_{[N1]}$) from the center of the at least one device into the segmentation corresponding to User A's device (e.g., a mobile phone). More specifically, if User A's device is connected to the top-right USB port of the at least one device (e.g., mobile tablet), then User A can drag the music file to the "User A segment" in the top-right corner of the user interface of the mobile tablet. In one or more embodiments, the UI of the at least one device can also present an electronic guide for selection of the content. The guide may be dynamic so that one or more content files not immediately present in the UI can also be shown to a user (e.g., by scrolling through the content). Moreover, a user can browse the electronic guide in different speeds and in one or more embodiments, a user can download only the electronic guide and make one or more selections of content offline.

In step 405, the distribution module 105 causes, at least in part, a rendering of the at least a portion of the content, one or more previews of the at least a portion of the content, or a combination thereof in the at least one of the one or more segmentations. By way of example, once the music file is in the "User A segment," User A can preview the music file (e.g., listen to a one minute sample of the song) in order to determine if he or she wants to purchase the music file.

In step 407, the distribution module 105 optionally causes, at least in part, a rendering of one or more advertisements, other related content, or a combination thereof in the at least one user interface, the one or more segmentations, or a combination thereof. As previously discussed, the distribution module 105 may be used as an FM transreceiver to broadcast one or more advertisements (e.g., advertisements for newly available content). In particular, the one or more advertisements may be recorded in one or more local languages. In addition, the distribution module 105 may determine to render one or more advertisements, other related content (e.g., local news), or a combination thereof before the distribution module 105 renders the selected content, the one or more previews, or a combination thereof.

In step 409, the distribution module 105 determines capability information associated with the at least one of the one or more other devices. By way of example the capability information may include information regarding the operating system, the folder structure, the file format, etc. associated with the one or more other devices (e.g., mobile phones). It is contemplated that the distribution module 105 determines this information in order to ensure that the content is distributed to the appropriate folder within the operating system of the one or more other devices. In step 411, the distribution module 105 processes and/or facilitates a processing of the capability information to determine at least one format of the at least a portion of the content that is at least substantially compatible with the at least one of the one or more other devices. By way of example the at least one format may include MP3, AAC, etc. file formats for music files, Portable Document Format (PDF) for electronic books, QUICKTIME File Format (MOV), WINDOWS Media Video Format (WMV), etc. for movie files and so forth.

In step 413, the distribution module causes, at least in part, a transfer of the at least a portion of the content to at least one of the one or more other devices associated with the at least one of the one or more segmentations. By way of example, if one or more users are interested in at least a portion of the content (e.g., a song file or an electronic book), he or she can click or touch a "download" button on the user interface of the at least one device (e.g., a mobile tablet) and the song or electronic book will be transferred to his or her mobile device. In one embodiment, the transfer process includes a rendering of a shopping cart and/or price and file size information associated with the content along with a payment mechanism. Accordingly, in this example use case, once the user makes the payment, the download starts on the user's mobile device. An illustrative example of the price and file size information associated with the content is depicted in FIG. 6.

FIG. 5 is a diagram of an example of one or more mobile devices utilized in the processes of FIGS. 3 and 4, according to one embodiment. More specifically, FIG. 5 depicts at least one device 501 (e.g., a mobile tablet or hub tablet) having at least one user interface 503 (e.g., a GUI) for distributing content (e.g., songs, movies, pictures, electronic books, mobile applications, homework assignments, etc.) to one or more other devices 505, 507, 509, and 511 (e.g., mobile phones). An illustrative example of the at least one user interface 503 is depicted in FIG. 6. In this example use case, the one or more other devices 505, 507, 509, and 511 are connected to the at least one device 501 via one or more physical ports (e.g., a USB port). In addition, the at least one user interface 503 depicts one or more segmentations associated with the at least one device (e.g., the center segmentation) and respective one or more of the one or more other devices 505, 507, 509, and 511 (e.g., the one or more segmentations on either side of the center segmentation). As previously discussed, in addition to enabling the transfer of content, the one or more physical ports of the at least one devices 501 can support a charging of the one or more other devices 505, 507, 509, and 511.

FIG. 6 is a diagram of a user interface utilized in the processes of FIGS. 3 and 4, according to various embodiments. As shown, the example user interface of FIG. 6 includes one or more user interface elements and/or functionalities created and/or modified based, at least in part, on information, data, and/or signals resulting from the processes (e.g., processes 300 and 400) described with respect to FIGS. 3 and 4. More specifically, FIG. 6 illustrates a user interface (e.g., interface 600) depicting one or more segmentations (e.g., segmentations 601, 603, 605, 607, 609, 611, 613, 615, and 617). In particular segmentation 601 corresponds to the at least one device (e.g., a mobile tablet or hub tablet) and segmentations 603, 605, 607, 609, 611, 613, 615, and 617 correspond one or more of the one or more other devices (e.g., mobile phones) connected to the at least one device. As previously discussed, the system 100 determines the status associated with the at least one device, the one or more other devices, or a combination thereof and causes a rendering of the status information in the one or more segmentations 601, 603, 605, 607, 609, 611, 613, 615, and 617. As shown in user interface 600, the segmentation 601 corresponding to the at least one device contains one or more content files (e.g., an electronic book, a music file, a mobile application, and a photo collection). Also, the user interface 600 also depicts that one or more other devices are connected to the at least one device via one or more physical ports such as one or more USB ports as depicted in segmentations 603, 607, 613 and 615 and one or more SD card ports as depicted in segmentations 609 and 617. The segmentations 603, 607, 609, 613, 615, and 617 further depict the content being previewed (e.g., segmentations 603, 613, and 617) and/or downloaded (e.g., segmentations 607, 609, and 615) from the at least one device, the cost and file size of the content, the total cost of the distributed content during the one or more connections, the status of one or more downloads between the one or more other devices and the at least one device, and the amount of memory available for one or more additional downloads. In one embodiment, the one or more segmentations also depict the battery life of the one or more other devices (e.g., segmentations 603, 607, 613, and 615.

The processes described herein for distributing content to multiple devices may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
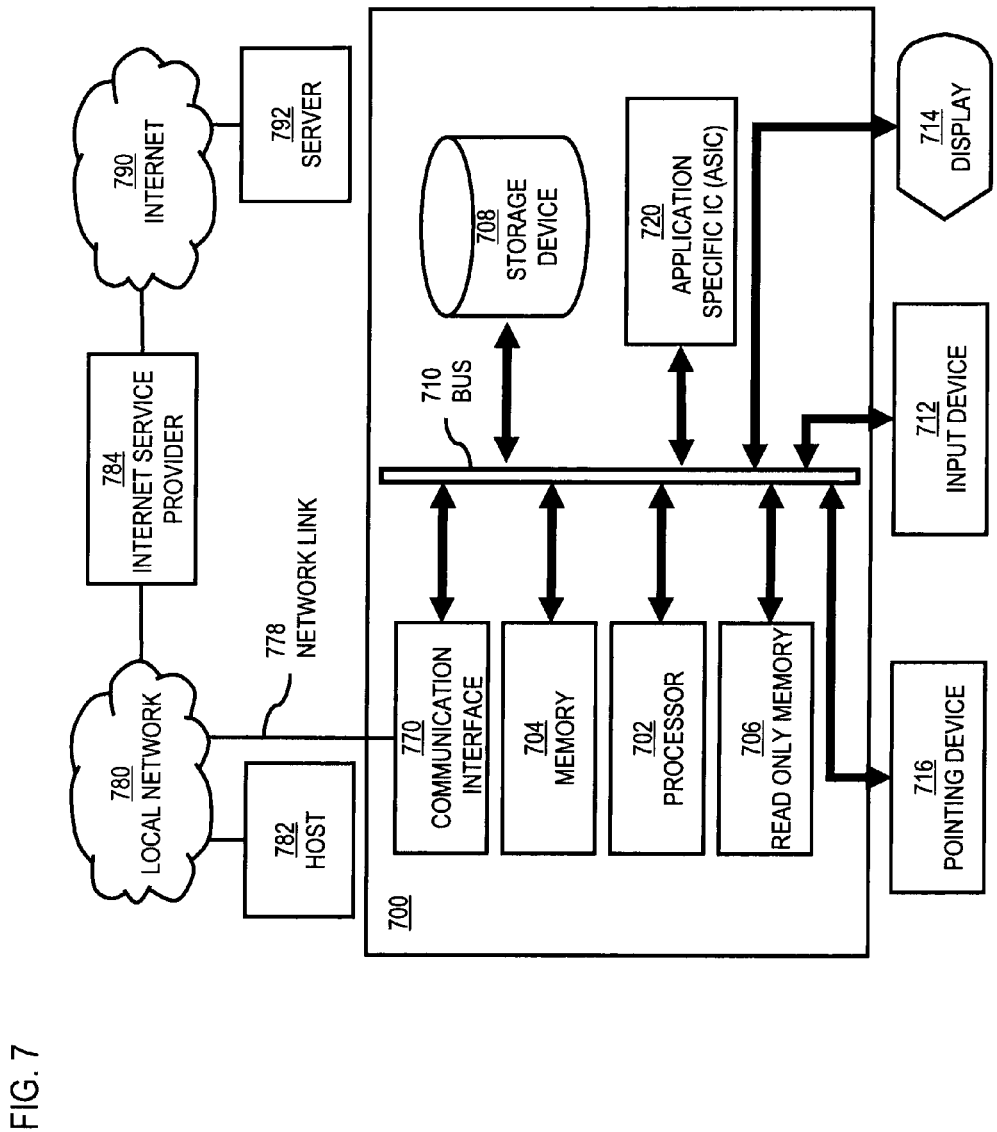
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to distribute content to multiple devices as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of distributing content to multiple devices.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to distribute content to multiple devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions.

Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for distributing content to multiple devices. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for distributing content to multiple devices, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 109 for distributing content to multiple devices to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to distribute content to multiple devices as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of distributing content to multiple devices.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to distribute content to multiple devices. The memory 805 also stores the data associated with or generated by the execution of the inventive steps.

Figure 9:
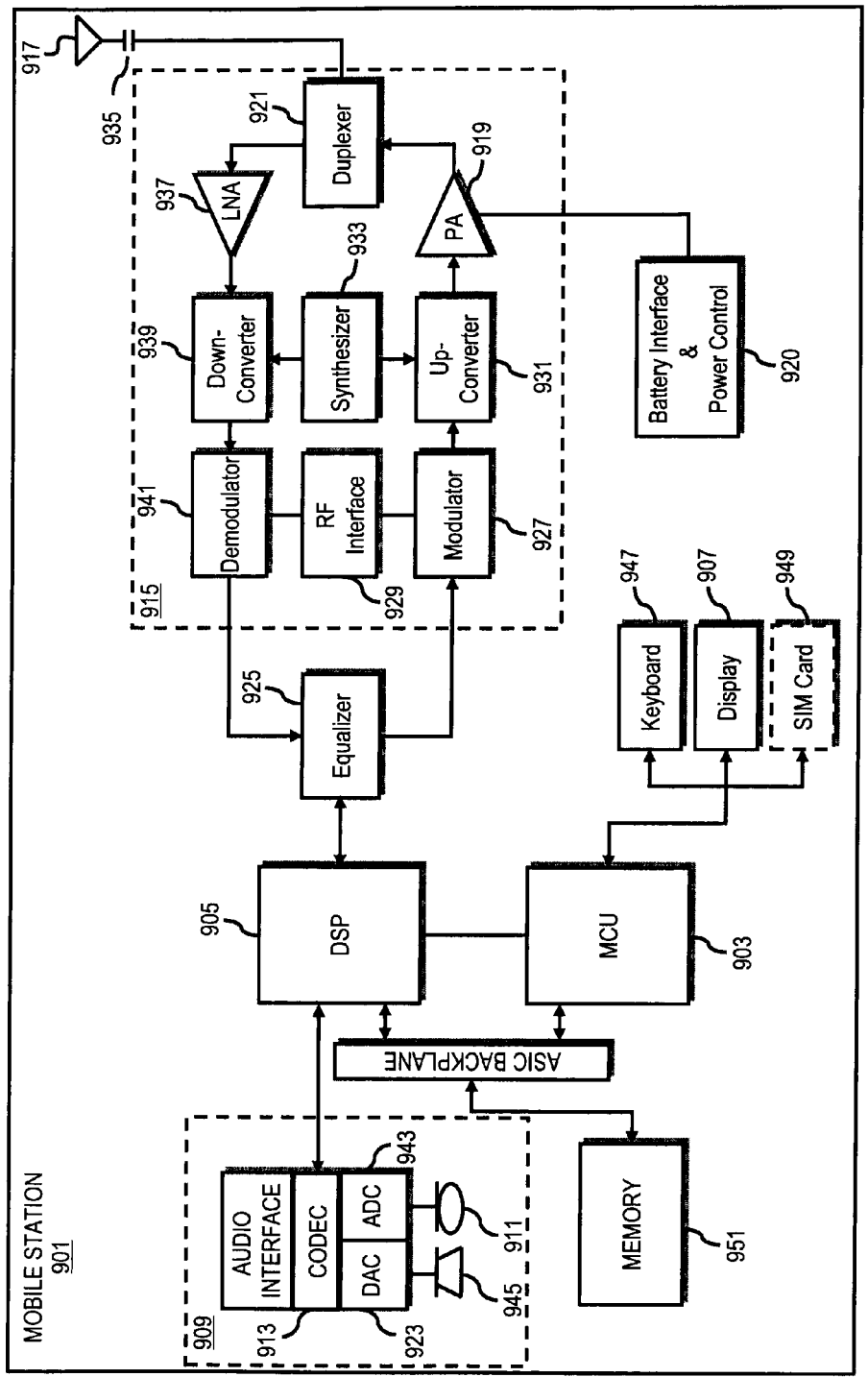
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of distributing content to multiple devices. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of distributing content to multiple devices. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to distribute content to multiple devices. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
rendering, by a hub device, a user interface thereon;
generating, by the hub device, segmentations of the user interface including a hub segmentation corresponding to the hub device and one or more other segmentations corresponding to respective one or more other devices each of which has connectivity to the hub device; and
distributing, by the hub device, content presented on the hub interface to the one or more other devices based, at least in part, on one or more user interactions with the hub segmentation, the one or more other segmentations, or a combination thereof.

2. A method of claim 1, further comprising:
determining one or more connectivity ports of the hub device, wherein the one or more other devices establish connectivity to the hub device via the one or more connectivity ports; and
assigning the one or more other segmentations to the one or more other devices based, at least in part, on the one or more connectivity ports.

3. A method of claim 2, wherein the one or more connectivity ports include one or more physical ports, one or more wireless ports, or a combination thereof.

4. A method of claim 3, wherein the one or more physical ports support a charging of the one or more other devices, accessing one or more services by the one or more other devices via one or more other segmentations, or a combination thereof.

5. A method of claim 2, further comprising:
processing the one or more user interactions to determine a selection of at least a portion of the content, at least one of the one or more other segmentations, or a combination thereof; and
initiating a transfer of the at least a portion of the content to at least one of the one or more other devices associated with the at least one of the one or more other segmentations.

6. A method of claim 4, wherein the one or more physical ports concurrently support the charging and the accessing.

7. A method of claim 5, further comprising:
determining capability information associated with the at least one of the one or more other devices; and
processing the capability information to determine at least one format of the at least a portion of the content that is at least substantially compatible with the at least one of the one or more other devices.

8. A method of claim 5, further comprising:
initiating a rendering of the at least a portion of the content, one or more previews of the at least a portion of the content, or a combination thereof in the at least one of the one or more other segmentations.

9. A method of claim 4, further comprising:
determining status information associated with the hub device, the one or more other devices, or a combination thereof, wherein the status information includes one or more status of the charging, one or more status of the accessing, or a combination thereof; and
initiating a rendering of the status information in the segmentations.

10. A method of claim 1, wherein the content is uploaded from at least one of the one or more other devices for distribution to the hub device, one or more other ones of the one or more other devices, or a combination thereof via the user interface, the segmentations, or a combination thereof, and wherein the one or more user interactions include touching, swiping, gesturing, tilting, pouring, dragging and dropping, or a combination thereof, one or more user interface elements across the segmentations.

11. An apparatus comprising:
at least one processor; and
at least one memory including computer program code for one or more programs, the at least one memory and the computer program code configured to, with the at least one processor, cause the apparatus embedded in a hub device to perform at least the following,
render, at the hub device, a user interface thereon;
generate segmentations of the user interface including a hub segmentation corresponding to the hub device and one or more other segmentations corresponding to respective one or more other devices each of which has connectivity to the hub device; and
distribute content presented on the hub interface to the one or more other devices based, at least in part, on one or more user interactions with the hub segmentation, the one or more other segmentations, or a combination thereof.

12. An apparatus of claim 11, wherein the apparatus is further caused to:
determine one or more connectivity ports of the hub device, wherein the one or more other devices establish connectivity to the hub device via the one or more connectivity ports; and
cause, at least in part, an assignment of the one or more segmentations to the one or more other devices based, at least in part, on the one or more connectivity ports.

13. An apparatus of claim 12, wherein the one or more connectivity ports include one or more physical ports, one or more wireless ports, or a combination thereof.

14. An apparatus of claim 13, wherein the one or more physical ports support a charging of the one or more other devices.

15. An apparatus of claim 12, wherein the apparatus is further caused to:
process the one or more user interactions to determine a selection of at least a portion of the content, at least one of the one or more other segmentations, or a combination thereof; and
initiate a transfer of the at least a portion of the content to at least one of the one or more other devices associated with the at least one of the one or more other segmentations.

16. An apparatus of claim 15, wherein the apparatus is further caused to:
initiate a rendering of the at least a portion of the content, one or more previews of the at least a portion of the content, or a combination thereof in the at least one of the one or more other segmentations.

17. An apparatus claim 15, wherein the apparatus is further caused to:
determine capability information associated with the at least one of the one or more other devices; and
process the capability information to determine at least one format of the at least a portion of the content that is at least substantially compatible with the at least one of the one or more other devices.

18. A non-transitory computer-readable storage medium carrying one or more sequences of one or more instructions which, when executed by one or more processors, cause an apparatus embedded in a hub device to at least perform the steps:
rendering, at the hub device, a user interface thereon;

generating segmentations of the user interface including a hub segmentation corresponding to the hub device and one or more other segmentations corresponding to respective one or more other devices each of which has connectivity to the hub device; and distributing content presented on the hub interface to the one or more other devices based, at least in part, on one or more user interactions with the hub segmentation, the one or more other segmentations, or a combination thereof.

19. A non-transitory computer-readable storage medium of claim 18, wherein the apparatus is caused, at least in part, to further perform:

determining one or more connectivity ports of the hub device, wherein the one or more other devices establish connectivity to the hub device via the one or more connectivity ports; and causing, at least in part, an assignment of the one or more segmentations to the one or more other devices based, at least in part, on the one or more connectivity ports.

20. A method of claim 6, wherein the one or more services include one or more social networking services, one or more firmware update services, one or more media streaming services, or a combination thereof.

* * * * *